Nov. 19, 1946.                B. D. FELD                 2,411,251

HYDRAULIC SCALE CAPSULE

Filed Dec. 4, 1943

INVENTOR
B. D. FELD
BY *Henry P Jennings*
ATTORNEY

Patented Nov. 19, 1946

2,411,251

UNITED STATES PATENT OFFICE 2,411,251

HYDRAULIC SCALE CAPSULE

Bernard D. Feld, Birmingham, Ala.

Application December 4, 1943, Serial No. 512,895

9 Claims. (Cl. 265—47)

This invention relates to hydraulic force measuring apparatus and has for an object the provision of a pressure producing unit in such apparatus which shall be adapted to develop a pressure which is an accurate indication of the force applied throughout the range of capacity of the apparatus.

A further, more specific, object of my invention is to provide a force responsive, pressure producing unit which shall present a constant head area to the force applied throughout the range of capacity of the unit.

A still more specific object of my invention is to provide a pressure producing unit which shall include upper and lower plate members with an interposed rubber ring gasket and liquid therebetween, and means to hold the ring gasket against lateral expansion responsive to the application of pressure.

Another object of my invention is to provide a pressure producing unit including upper and lower plates with an interposed ring gasket for holding liquid between the plates and means to compensate for the flow of rubber in the ring responsive to pressure thereon.

In the operation of hydraulic scales, difficulties have been encountered in designing a pressure producing unit which will present a constant area to the applied force, particularly when heavy loads are applied. As the diaphragms usually embodied in such units are flexed in response to pressure their areas vary, thus varying the unit of force transmitted thereby. It is a particular object of my invention to provide a pressure producing unit which is not dependent upon a flexible diaphragm, but which shall include as its resilient element a rubber ring gasket seated in grooves, together with retaining means to hold the ring against shifting with respect to the grooves, and affording means to compensate for the flow of rubber responsive to pressure.

Figure 1:
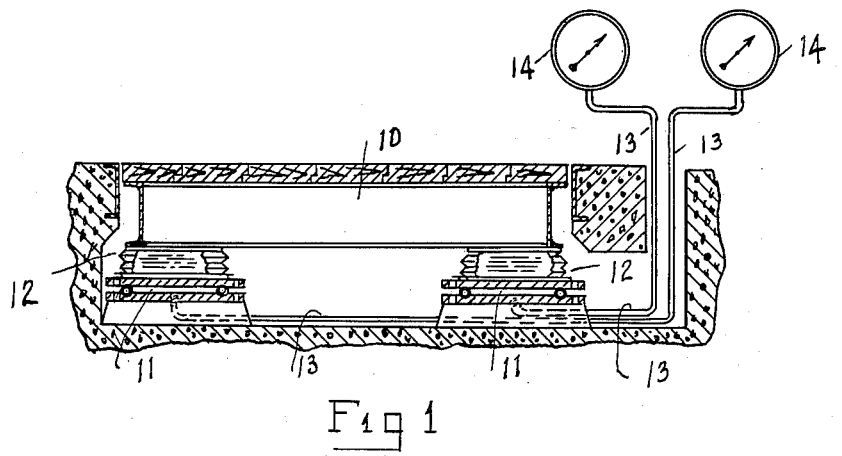
Figure 2:
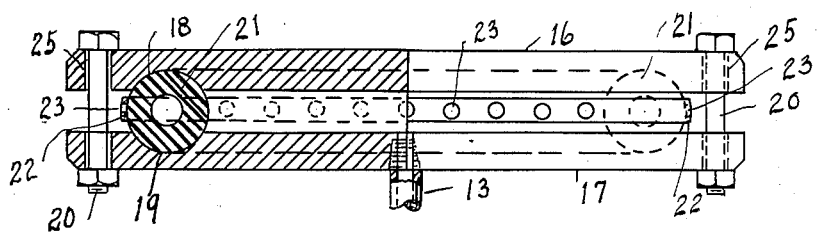

Apparatus embodying features of my invention is illustrated in the accompanying drawing forming a part of this application, in which Fig. 1 is a sectional view of a hydraulic scale having my improved pressure producing unit incorporated therein and Figs. 2 to 6 inclusive are detail sectional views showing different forms of my pressure producing unit.

Referring to the drawing for a better understanding of my invention, I show in Fig. 1 a hydraulic scale embodying a weighbridge 10 resting on my improved pressure producing units 11, only two being shown, but any suitable number being employed as is well understood. In order that the pressure may be evenly distributed on the pressure producing units, I preferably interpose between the weighbridge and the units 11 a bellows 12 which is filled with liquid but which retains sufficient flexibility to transmit to the pressure producing units an evenly distributed force. As is well understood, the units 11 are adapted to contain a liquid and produce a pressure responsive to the force applied. In Fig. 1, I show a pipe 13 connected to each of the units 11 which, for the purpose of illustration, leads to a pressure indicating device 14. It will be understood however that the pressure, or force indicating means, forms no part of my invention and any suitable means known to the art may be employed.

My improved pressure developing unit is comprised of an upper plate 16 and a lower plate 17, the plates having formed therein opposed circular grooves 18 and 19 which are preferably arcuate in cross section. Seated in the grooves to adapt the unit to retain a liquid is a rubber ring gasket 21. In order to hold the plates and gasket in assembled relation until installed, I provide a plurality of bolts 20 which pass through suitable holes 25 in the plates 16 and 17, which holes are larger in diameter than the bolts. It will be seen that when pressure or weight is applied to the upper plate 16, the gasket 21 is compressed, creating pressure on the liquid within the unit. The edges of the grooves 18 and 19 determine the area of the plates 16 and 17 which are subjected to pressure. In order that the pressure thus developed may not force the ring gasket to become displaced laterally in the grooves and thus change the area subjected to pressure, and at the same time provide for the flow of the rubber responsive to pressure, I provide a relatively non-expansible, non-elastic reinforcing means for the gasket. This reinforcing means may assume a variety of forms, many of which will suggest themselves to those skilled in the art. For example, in Fig. 2, I show a metal ring 22 surrounding the gasket 21 and preferably vulcanized thereto. Sufficient clearance is provided between the upper and lower edges of the ring to permit the gasket to be compressed responsive to the load upon it. In order that the rubber may be permitted to flow responsive to pressure, I provide a multiplicity of holes 23 in the ring. In molding the gasket, the rubber is preferably allowed to flow into the holes 23, thus forming slight protuberances extending through the holes, which protuberances facilitate the flow of rubber.

Figures 3, 4:
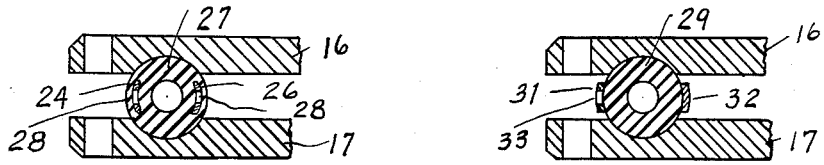
Figures 5, 6:
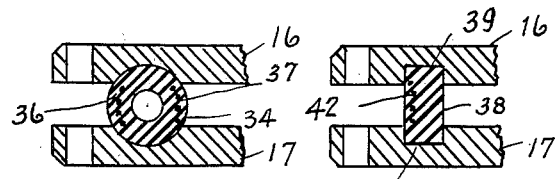

In Fig. 3 I show another form of my invention in which metal rings 24 and 26 are molded into the gasket 27, said rings being provided with holes 28 therein to afford means for the flow of the rubber. In Fig. 4 I show a gasket 29 having metal rings 31 and 32 vulcanized both to the outer and inner surfaces thereof, the outer ring 31 being provided with a plurality of holes 33 therein for the flow of rubber. In Fig. 5, I show a still further form of reinforcing means in which the gasket 34 is provided with a plurality of reinforcing wire rings 36 and 37 near the peripheries at the sides of the gasket. In Fig. 6 there is shown a still further form of gasket 38 which is seated in rectangular grooves 39 and 41 formed in the upper and lower plates 16 and 17. The gasket 38 is rectangular in cross section to fit the grooves 39 and 41 and is provided with reinforcing rings 42 therein near the outer surface at the side.

In all the embodiments of my invention, the reinforcing means employed is so disposed as to permit the necessary compression of the gasket responsive to pressure, and to permit flow of the rubber comprising the gasket responsive to the pressure applied.

It will be seen that with my improved unit only such bolts are required as are necessary to hold the upper and lower plates in assembled relation until installed. As soon as sufficient pressure is applied to the upper plate 16, all possibility of leakage of the liquid out of the unit ceases and such retaining means as are employed have no further function. For this purpose, the holes 25 for the bolts 20 are made larger in diameter than the bolts to allow for freedom of movement of the upper plate.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and reinforcing means for the gasket to hold it against lateral displacement.

2. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and metal reinforcing means for the gasket to retain it against lateral displacement in the grooves.

3. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, metal reinforcing means for the gasket to retain it against lateral displacement in the grooves, there being openings through said metal reinforcing means to provide for the flow of rubber responsive to pressure.

4. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and metal reinforcing means incorporated in the gasket to retain it against lateral displacement in the grooves.

5. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, metal reinforcing means incorporated in the gasket to retain it against lateral displacement in the grooves, there being openings through said metal reinforcing means to provide for flow of the rubber responsive to pressure thereon.

6. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and a plurality of reinforcing wires incorporated in the rubber ring to retain it against lateral displacement in the grooves.

7. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and metal wires incorporated in the ring near the outer sides thereof to retain the ring against lateral displacement in the grooves.

8. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and metal wires incorporated in the ring near the outer sides thereof to retain the ring against lateral displacement in the grooves, said wires being spaced to provide for flow of the rubber responsive to pressure.

9. A load responsive pressure producing unit for a hydraulic force measuring apparatus comprising spaced upper and lower plates having circular grooves in their opposed faces near the peripheries thereof, a rubber ring gasket seated in said grooves to form a resilient seal, whereby said unit is adapted to contain a liquid subject to pressure transmitted thereto by said plates under load, and metal reinforcing rings for the outer side portion of the gasket between the plates and spaced from the plates to permit compression of the rubber in the gasket.

BERNARD D. FELD.